United States Patent
Guo et al.

(10) Patent No.: US 12,520,242 B2
(45) Date of Patent: Jan. 6, 2026

(54) DERIVATIVE BASED HARD LIMIT TRIGGERING FOR AVERAGE POWER CONTROL IN AAS

(71) Applicant: Telefonaktiebolaget LM Ericsson (publ), Stockholm (SE)

(72) Inventors: Shiguang Guo, Kanata (CA); Torbjörn Wigren, Uppsala (SE); Ken Huisman, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 404 days.

(21) Appl. No.: 17/791,288

(22) PCT Filed: Jan. 7, 2021

(86) PCT No.: PCT/IB2021/050095
§ 371 (c)(1),
(2) Date: Jul. 7, 2022

(87) PCT Pub. No.: WO2021/140462
PCT Pub. Date: Jul. 15, 2021

(65) Prior Publication Data
US 2023/0354210 A1    Nov. 2, 2023

Related U.S. Application Data

(60) Provisional application No. 62/957,940, filed on Jan. 7, 2020.

(51) Int. Cl.
*H04W 52/22* (2009.01)
*H04W 52/36* (2009.01)

(52) U.S. Cl.
CPC ....... *H04W 52/225* (2013.01); *H04W 52/367* (2013.01)

(58) Field of Classification Search
CPC . H04W 52/225; H04W 52/367; H04W 88/08; H04W 52/143
See application file for complete search history.

(56) References Cited

U.S. PATENT DOCUMENTS

| | | | |
|---|---|---|---|
| 2010/0091791 A1* | 4/2010 | Willenegger | H04W 52/346 370/465 |
| 2012/0172081 A1* | 7/2012 | Love | H04W 52/367 455/522 |
| 2021/0021313 A1* | 1/2021 | Wigren | H04B 7/0617 |

FOREIGN PATENT DOCUMENTS

| | | |
|---|---|---|
| EP | 1354427 | 8/2002 |
| WO | 2019194714 A1 | 10/2019 |
| WO | 2019194719 A1 | 10/2019 |

OTHER PUBLICATIONS

X. Shen, J. Ma and G. Dai, "PID-based power adjustment for topology control in wireless sensor networks," 2007 IET Conference on Wireless, Mobile and Sensor Networks (CCWMSN07), Shanghai, 2007, pp. 632-635 (Year: 2007).*

(Continued)

*Primary Examiner* — Charles C Jiang
*Assistant Examiner* — Margaret Marie Anderson
(74) *Attorney, Agent, or Firm* — Weisberg I.P. Law, P.A.

(57) ABSTRACT

According to one or more embodiments, a network node for controlling transmit power is provided. The network node includes processing circuitry configured to estimate a derivative of time-averaged transmit power of the network node, determine that the estimated derivative meets a first threshold, and trigger at least one action to limit the time-averaged transmit power of the network node based on the determination that the estimated derivative meets the first threshold.

14 Claims, 14 Drawing Sheets

(56) References Cited

OTHER PUBLICATIONS

European Search Report dated Oct. 2, 2023 for Application No. 21700234.4, consisting of 7 pages.
International Search Report and Written Opinion dated Apr. 8, 2021 for International Application No. PCT/IB2021/050095 filed Jan. 7, 2021, consisting of 15 pages.
Tornevik et al. "Time Averaged Power Control of a 4G or a 5G Radio Base Station for RF EMF Compliance" IEEEAccess; vol. 8; 211937-211950; Nov. 19, 2020, consisting of 14 pages.
3GPP TS 36.331 V9.6.0; 3rd Generation Partnership Project; Technical Specification Group Radio Access Network; Evolved Universal Terrestrial Radio Access (E-UTRA); Radio Resource Control (RRC); Protocol specification (Release 9); Mar. 2011, consisting of 252 pages.
3GPP TS 38.214 V15.3.0; 3rd Generation Partnership Project; Technical Specification Group Radio Access Network; NR; Physical layer procedures for data (Release 15); Sep. 2018, consisting of 96 pages.
3GPP TS 38.331 V15.3.0; 3rd Generation Partnership Project; Technical Specification Group Radio Access Network; NR; Radio Resource Control (RRC) protocol specification (Release 15); Sep. 2018, consisting of 444 pages.

* cited by examiner

DERIVATIVE BASED HARD LIMIT TRIGGERING FOR AVERAGE POWER CONTROL IN AAS

CROSS-REFERENCE TO RELATED APPLICATIONS

This application is a Submission Under 35 U.S.C. § 371 for U.S. National Stage Patent Application of International Application No.: PCT/IB2021/050095, filed Jan. 7, 2021 entitled "DERIVATIVE BASED HARD LIMIT TRIGGERING FOR AVERAGE POWER CONTROL IN AAS," which claims priority to U.S. Provisional Application No. 62/957,940, filed Jan. 7, 2020, the entireties of both of which are incorporated herein by reference.

TECHNICAL FIELD

Wireless communication and in particular, to controlling average transmit power.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

RF Exposure Regulations

When any radio equipment is to be deployed, regulatory radio frequency (RF) electromagnetic field (EMF) exposure regulations need to be accounted for. These exposure limitations are typically based on the guidelines from the International Commission on Non-Ionizing Radiation Protection (ICNIRP) but may take different forms in some countries and regions. The aim of the RF exposure regulations is to secure that the human exposure to RF energy, is kept within safe limits, which have been set with wide safety margins.

Compliance with the RF exposure limitations needs certain considerations when base stations and radios are equipped with advanced antenna systems (AAS). These AASs increase the capacity and/or coverage by addition of an antenna array that increases the beamforming gain significantly. One consequence is that the traditionally used methods for calculation of RF exposure compliance distances and exclusion zones based on the maximum Effective Isotropic Radiated Power, also known as Equivalent Isotropic Radiated Power (EIRP), of the node, tend to generate significantly increased results compared to equipment without AAS. This increases the deployment challenges, which is why operators are requesting functionality for reduction of RF exposure compliance distances and exclusion zones, while strictly maintaining compliance with RF exposure regulations.

More specifically, the RF exposure limitations are typically expressed as the average power density over a specified time interval T. This time averaging opens up a possibility for the requested reductions. Given a distance and knowledge of the AAS gain in the corresponding direction, the power density limit can be transformed to a corresponding power threshold, for the average total transmitted power. Thus, the momentary power can be significantly higher than the threshold during shorter times than T, however the transmitted average power must then be guaranteed to be below the threshold, typically obtained from the calculation of a reduced exclusion zone. Thus, to be allowed to use a RF exposure compliance distance, that is shorter than what is obtained using the maximum EIRP of the AAS equipped node, control functionality is needed that guarantees that the average power is below the threshold 100% of the time.

Frequency Domain Linear Automatic Control

The following subsection explains the basics of the terminology used when describing linear frequency domain functionality for automatic control. This terminology is part of the prior art in the field of automatic control. As a start a number of representations of a dynamic process need to be introduced. A dynamic process is one where the output depends not only on the present input signal but also of previous inputs and outputs. Put otherwise the dynamic process has memory. The most basic dynamic process is the linear one that can be described by a differential equation as $$y^{(n)}(t)+a_1 y^{(n-1)}(t)+ \ldots +a_n y(t)=b_0 u^{(m)}(t)+ \ldots b_m u(t).$$

Here y(t) is the output signal, u(t) is the input signal, t is the time, while $a_i$ i=1 . . . n, and j=0, . . . , m are constant parameters. (i) denotes differentiation with respect to time i times. The above differential equation has order n. It has one input signal and one output signal.

For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is $$H(s) = \frac{B(s)}{A(s)} = \frac{b_0 s^m + b_1 s^{m-1} + \ldots + b_m}{s^n + a_1 s^{n-1} + \ldots + a_n}.$$

The relation between the output signal and input signal Laplace transforms Y(s) and U(s) is $$Y(s)=H(s)U(s).$$

The poles $p_i$ i=1, . . . , n of the process are given by the equation A(s)=0. For simplicity only strictly stable (open loop) processes with all poles in the left complex half plane is considered here. In general, poles are real or complex conjugate pairs.

The properties of the dynamic process can also be studied in the frequency domain in terms of complex valued frequency functions Y(jω), H(jω) and U(jω), ω denotes the angular frequency that fulfils $$\omega=2\pi f,$$

where f is the frequency in Hz. Below, frequency is used for angular frequency.

The following definition are best explained with respect to FIG. 1, where $F_y(s)$ is the feedback gain. The closed loop system is then computed as follows $$Y(s)=W(s)+H(s)F_y(s)(Y_{ref}(s)-Y(s)),$$

which gives $$Y(s) = \frac{F_y(s)H(s)}{1+F_y(s)H(s)}Y_{ref}(s) + \frac{1}{1+F_y(s)H(s)}W(s).$$

This gives the effect of the reference signal and the disturbance on the output. The remaining definitions now follow as The closed loop bandwidth $\omega_{CL}$ of the control system is given by the equation $$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2.$$

The closed loop static error of the control system is given by the equation $$y_{ref} - y = \frac{1}{1+F_y(0)H(0)}(y_{ref} - w).$$

The static disturbance rejection of the control system is given by the static sensitivity function $$S(0) = \frac{1}{1+F_y(0)H(0)}.$$

The dynamic disturbance rejection of the control system is determined by the sensitivity function $$S(j\omega) = \frac{1}{1+F_y(j\omega)H(j\omega)}.$$

The complimentary sensitivity function of the control system, $T(j\omega)=1-S(j\omega)$ determines the robustness of the control system with respect to un-modelled dynamics.

Next, a basic proportional-integral (PI) controller is described, starting with a motivation for integrating control. The idea of integrating control is to compute the control signal from the integral of the control error. Clearly, then, the magnitude of the control signal will increase as long as there is a remaining control error with constant sign. This means that the actuator will act increasingly hard to remove the control error. If the dynamics is linear the only way a steady state solution can be achieved is when the integrating controller steers the control error to zero, in which case $$y_{ref}=y.$$

This property holds when the control system is stable, irrespective of the dynamics of the un-controlled system. On the negative side, integrating control reduces stability margins which is the reason why PI control applies a mix of proportional and integrating control, using the dynamic controller $$F_y(s) = \left(C_1 + \frac{1}{T_I}\frac{1}{s}\right).$$

Here $C_1$ is the proportional gain and $T_I$ the integration time. 1/s is the Laplace transform of an integration operation in time. It can be noted that since the controller has two free tuning parameters, the proportional gain and the integration time, arbitrary pole locations can be assigned to any second order feedback loop. Such pole-placement design will be applied to determine the controller in the power back-off control feature.

Hard Limit

When the average power gets too close to the determined power threshold, a hard limit is applied immediately. This prevents the occurrence of the potential overshoot, thereby avoiding exceeding the power threshold and violating the applicable regulation.

In case of a triggered hard limit, the scheduler will be restricted to use a minimum number of physical resource blocks (PRBs) of the resource grid. This is because the number of data carrying PRBs are directly proportional to the transmitted power, thereby creating a momentary power actuator mechanism. Mathematically, this is expressed as follows:

If $\langle P_{tot}\rangle(t)>\text{margin}*P_{max,site}$ $\gamma(t)=\gamma_{low}.$ end if Here $\gamma_{low}$ is the minimum fraction of PRBs to use, with respect to the total number of resource blocks. $\langle P_{tot}\rangle(t)$ denotes the average power at time t, $P_{max,site}$ is the maximum power of the radio source (typically a base station) and margin is a margin parameter.

There currently exist certain challenge(s).

In a live network, traffic changes could be very drastic and unpredictable. As illustrated in FIG. 2, traffic could be very low for a period of time (such as 0 Mbps required for 10 minutes) and very high for a different period of time (such as 50 Mbps for 10 minutes) and this pattern may repeat itself. Although not very likely in a live network, this could be the case during product test.

In this case, since the traffic change is so drastic, the hard limit loop based on averaged power is not fast enough to prevent an overshoot of the computed power threshold, when tuned for normal traffic, meaning that margin would have to be significantly reduced to avoid a limit violation. For example, as illustrated in FIG. 3, the hard limit occurs in 481 seconds as highlighted by the rectangular box in FIG. 3. Since the time averaged power continues to rise afterwards, the overshoot (exceeding 50 watts) happens after 554 second. The reason is that it is not possible to regulate down toward 0 in as fine steps as would be needed. Therefore, idling momentary power continues to add to the total power content of the averaging window, in the end causing an overshoot.

Hence, existing power control methodologies suffer from various shortcomings.

SUMMARY

Some embodiments advantageously provide a method and system for controlling average transmit power.

According to one aspect of the disclosure, a network node for controlling transmit power is provided. The network node includes processing circuitry configured to estimate a derivative of time-averaged transmit power of the network node, determine that the estimated derivative meets a first threshold, and trigger at least one action to limit the time-averaged transmit power of the network node based on the determination that the estimated derivative meets the first threshold.

According to one or more embodiments of this aspect, the estimate of the derivative of time-averaged transmit power is performed using a Proportional-Integral, PI, control function where an integrator has been factored out to provide a proportional term and derivative term. According to one or more embodiments of this aspect, the PI control function with the factored out integrator provides average power back-off control with an integrating resource limiting threshold. According to one or more embodiments of this aspect, the at least one action includes limiting a quantity that correlates with momentary transmit power output by the network node.

According to one or more embodiments of this aspect, the quantity is a quantity of resources used for transmission. According to one or more embodiments of this aspect, the processing circuitry is further configured to determine total momentary output power of the network node by one of measuring the total momentary output power and predicting the total momentary output power. According to one or more embodiments of this aspect, the predicting of the total momentary output power is based at least on estimating resources used at at least one time instant over time.

According to one or more embodiments of this aspect, the processing circuitry is further configured to monitor the time-averaged transmit power with respect to a second threshold where the estimated derivative is configured to meet the first threshold before the time-averaged transmit power meets the second threshold. According to one or more embodiments of this aspect, the processing circuitry is further configured to discretize a dynamic resource threshold that corresponds to a portion of total resources used for transmission, and a control signal that is based on a proportional-derivative (PD) type function that is used to estimate the derivative of time-averaged transmit power. According to one or more embodiments of this aspect, the limiting of the time-averaged transmit power corresponds to reducing the time-average transmit power.

According to another aspect of the disclosure, a method implemented by a network node for controlling transmit power is provided. A derivative of time-averaged transmit power of the network node is estimated. A determination is made that the estimated derivative meets a first threshold. At least one action is triggered to limit the time-averaged transmit power of the network node based on the determination that the estimated derivative meets the first threshold.

According to one or more embodiments of this aspect, the estimate of the derivative of time-averaged transmit power is performed using a Proportional-Integral, PI, control function where an integrator has been factored out to provide a proportional term and derivative term. According to one or more embodiments of this aspect, the PI control function with the factored out integrator provides average power back-off control with an integrating resource limiting threshold. According to one or more embodiments of this aspect, the at least one action includes limiting a quantity that correlates with momentary transmit power output by the network node.

According to one or more embodiments of this aspect, the quantity is a quantity of resources used for transmission. According to one or more embodiments of this aspect, a total momentary output power of the network node is determined by one of measuring the total momentary output power and predicting the total momentary output power. According to one or more embodiments of this aspect, the predicting of the total momentary output power is based at least on estimating resources used at at least one time instant over time. According to one or more embodiments of this aspect, a second threshold is monitored using time-averaged transmit power, the estimated derivative being configured to meet the first threshold before the time-averaged transmit power meets the second threshold.

According to one or more embodiments of this aspect, a dynamic resource threshold that corresponds to a portion of total resources used for transmission and a control signal that is based on a proportional-derivative (PD) type function that is used to estimate the derivative of time-averaged transmit power are discretized. According to one or more embodiments of this aspect, the limiting of the time-averaged transmit power corresponds to reducing the time-average transmit power.

According to another aspect of the disclosure, a computer program product for controlling transmit power of a network node is provided. The computer program product includes computer readable program code that, when executed by a processor, causes the computer program product to perform one or more methods described herein.

According to another aspect of the disclosure, a computer program for controlling transmit power of a network node is provided. The computer program, when executed by a processor, performing one or more methods described herein.

According to another aspect of the disclosure, a computer readable medium for controlling transmit power of a network node is provided. The computer readable medium includes instructions, when executed by a processor, cause the processor to perform one or more methods described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Certain aspects of the present disclosure and their embodiments may provide solutions to these or other challenges.

The present disclosure and their embodiments disclose the use of an estimated derivative of the time-averaged power to determine when the hard limit should be triggered. When the derivative is higher than a threshold, it is likely that a sharp traffic rise has occurred recently. This determination, in conjunction with a time-averaged power threshold, can be used to trigger the hard limit.

Various embodiments as described herein which address one or more of the issues disclosed herein. Certain embodiments may provide one or more of the following technical advantage(s): the application of the hard limit earlier than, for example, a time average threshold limit, thereby prevent overshoots, and providing embodiments that have very low computation complexity.

Figure 1:
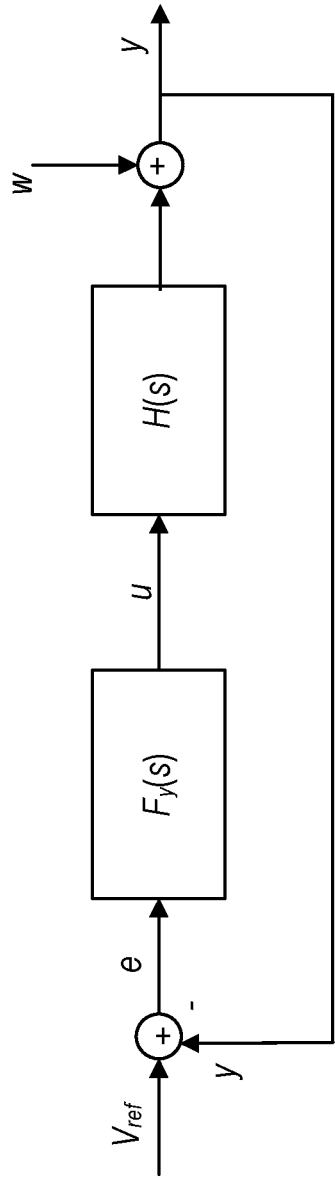
FIG. 1 is a defining block diagram.
Figure 2:
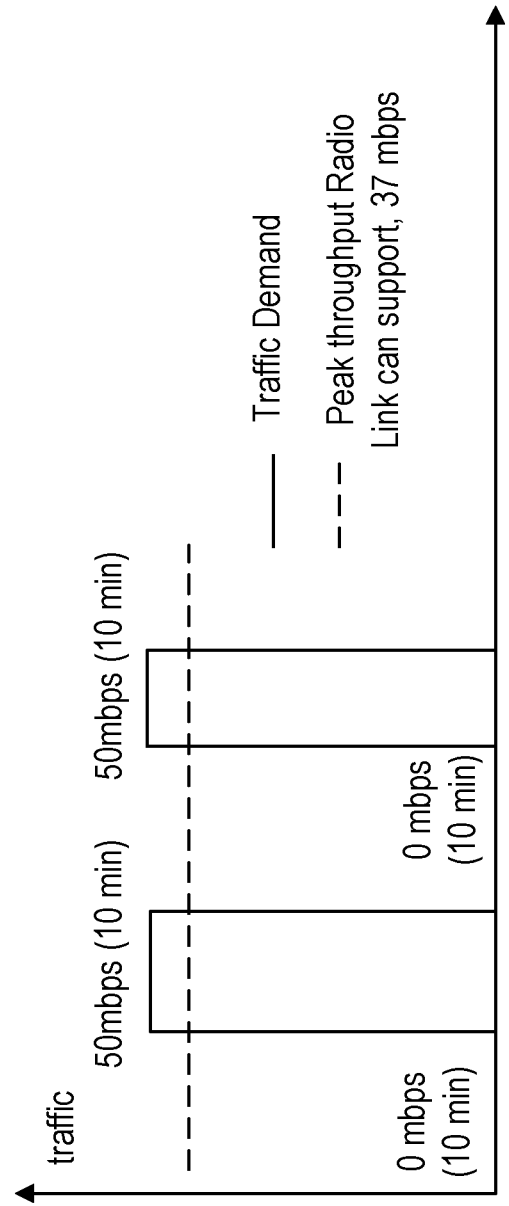
FIG. 2 is diagram of a test traffic profile.
Figure 3:
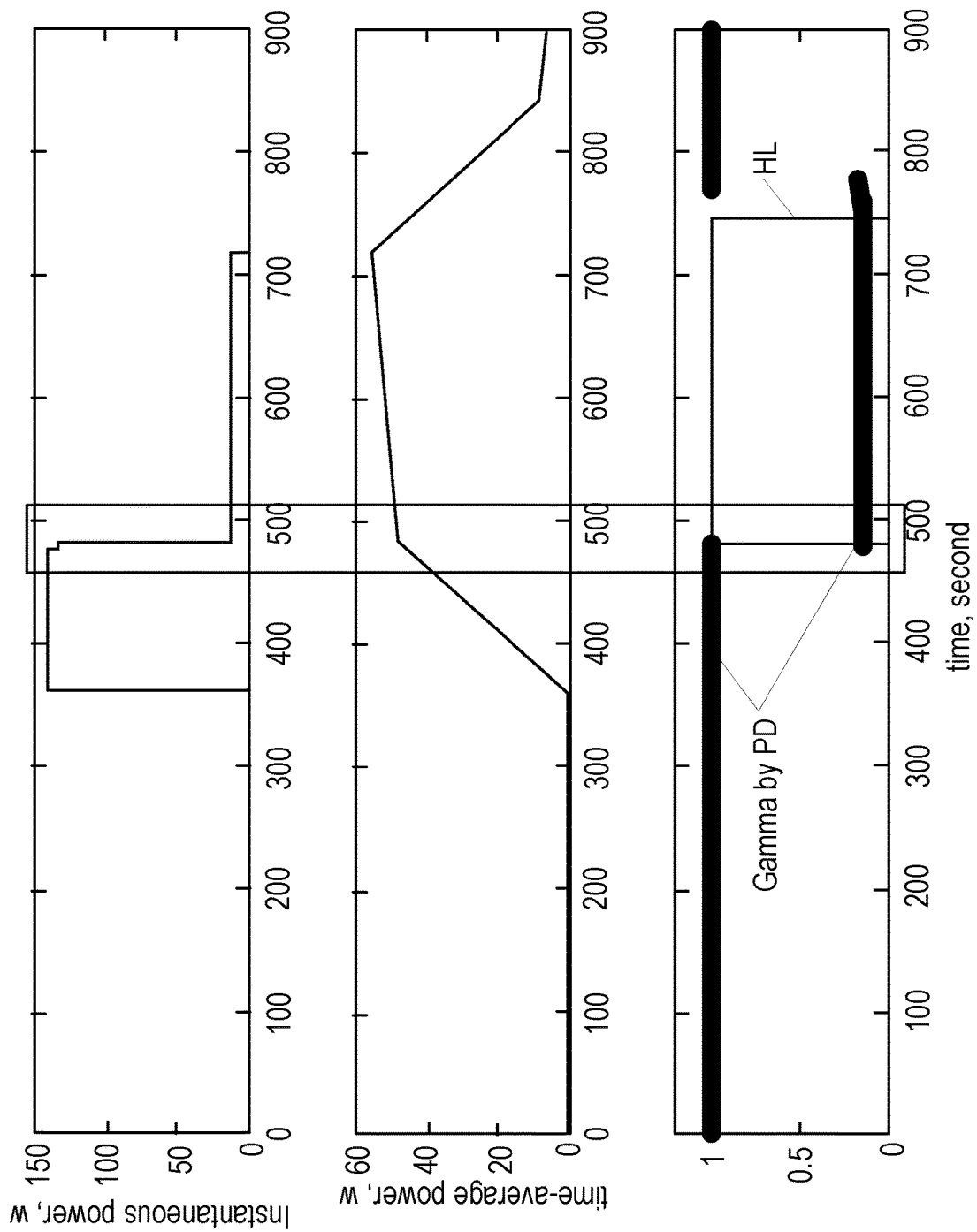
FIG. 3 is a diagram of an average power based hard limit.
Figure 4:
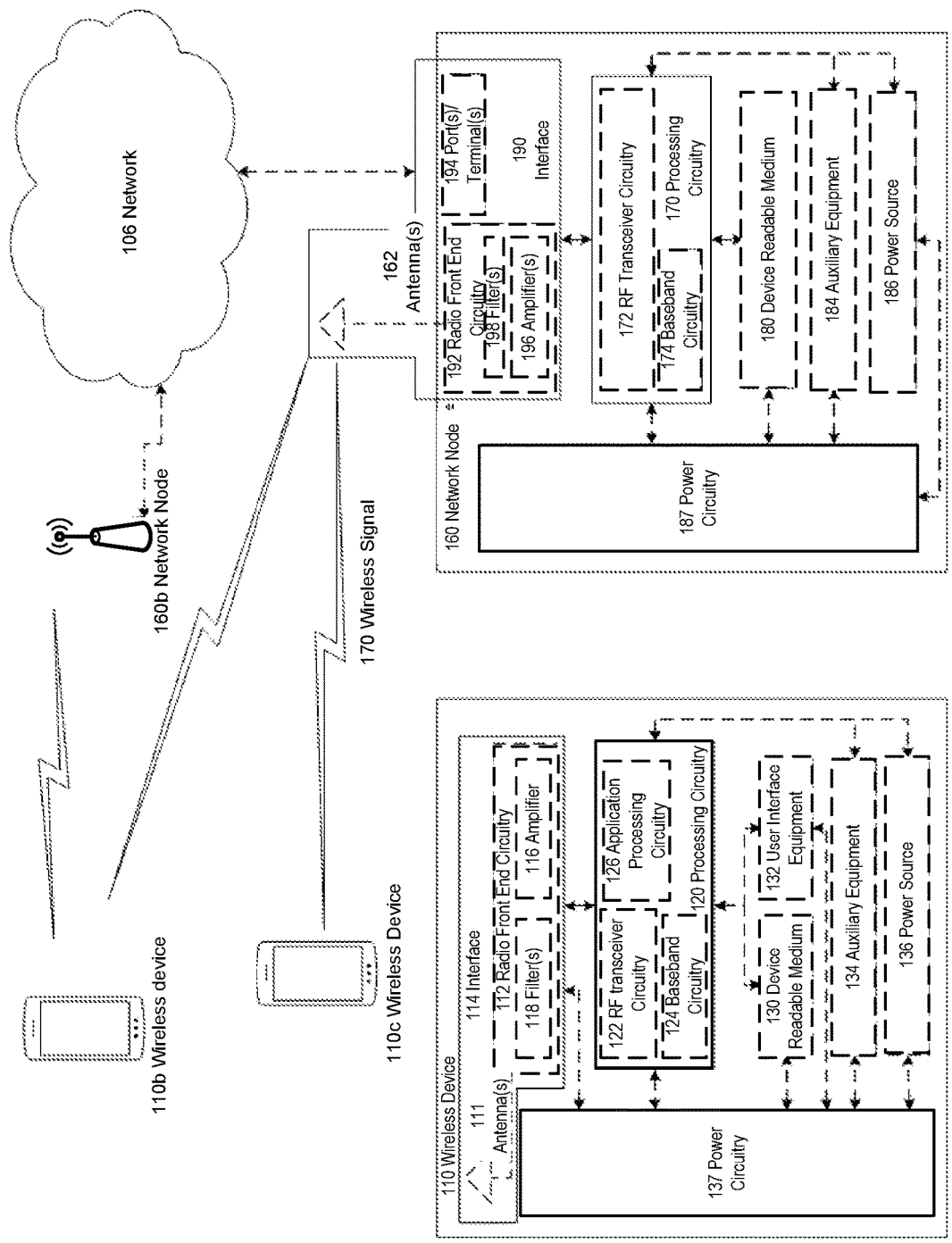
FIG. 4 is a diagram of a wireless network in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 4. Of note, like reference designators in the figures refer to like elements. For simplicity, the wireless network of FIG. 4 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD)

or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source, in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 5:
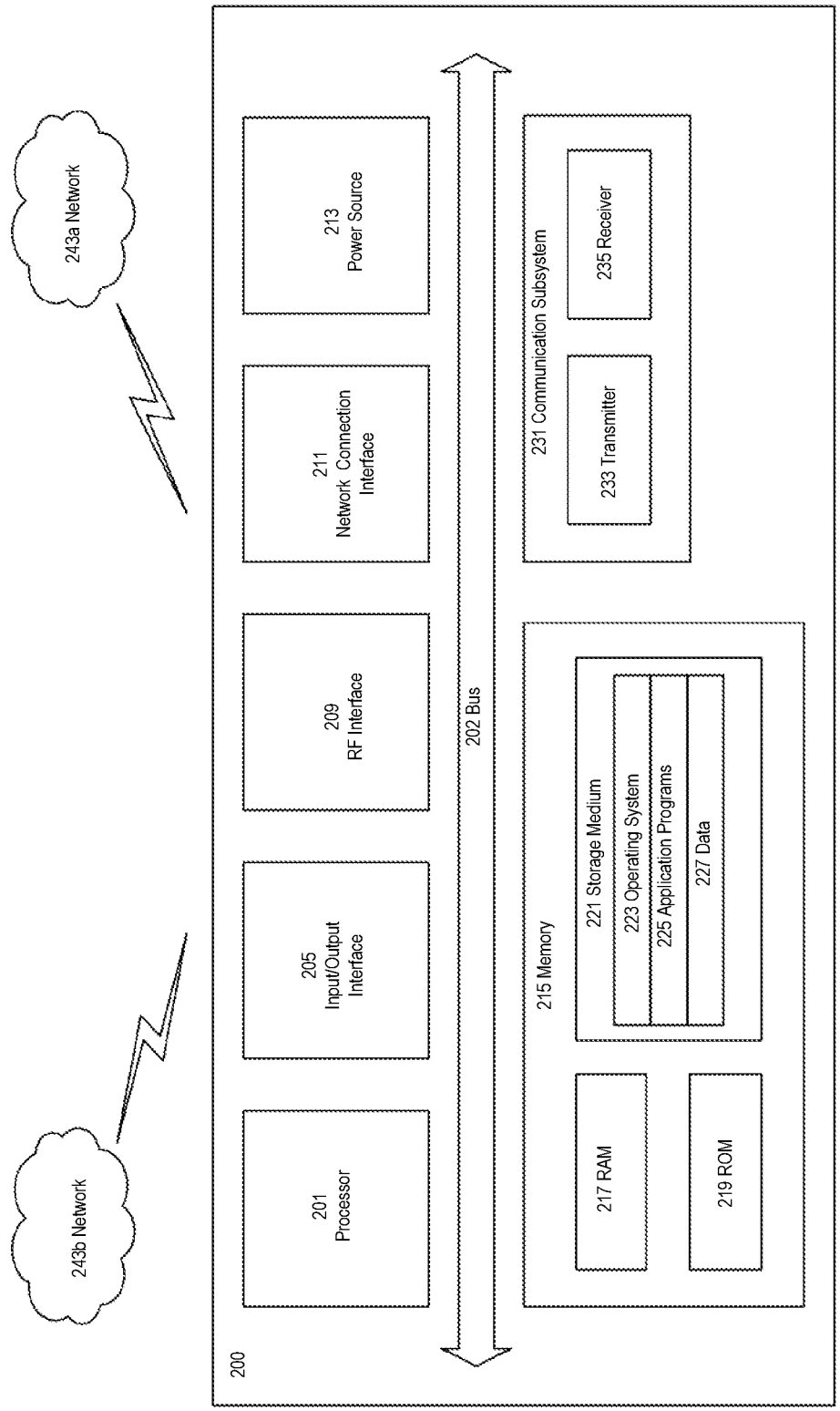
FIG. 5 is a diagram of user equipment in accordance with some embodiments of the present disclosure.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
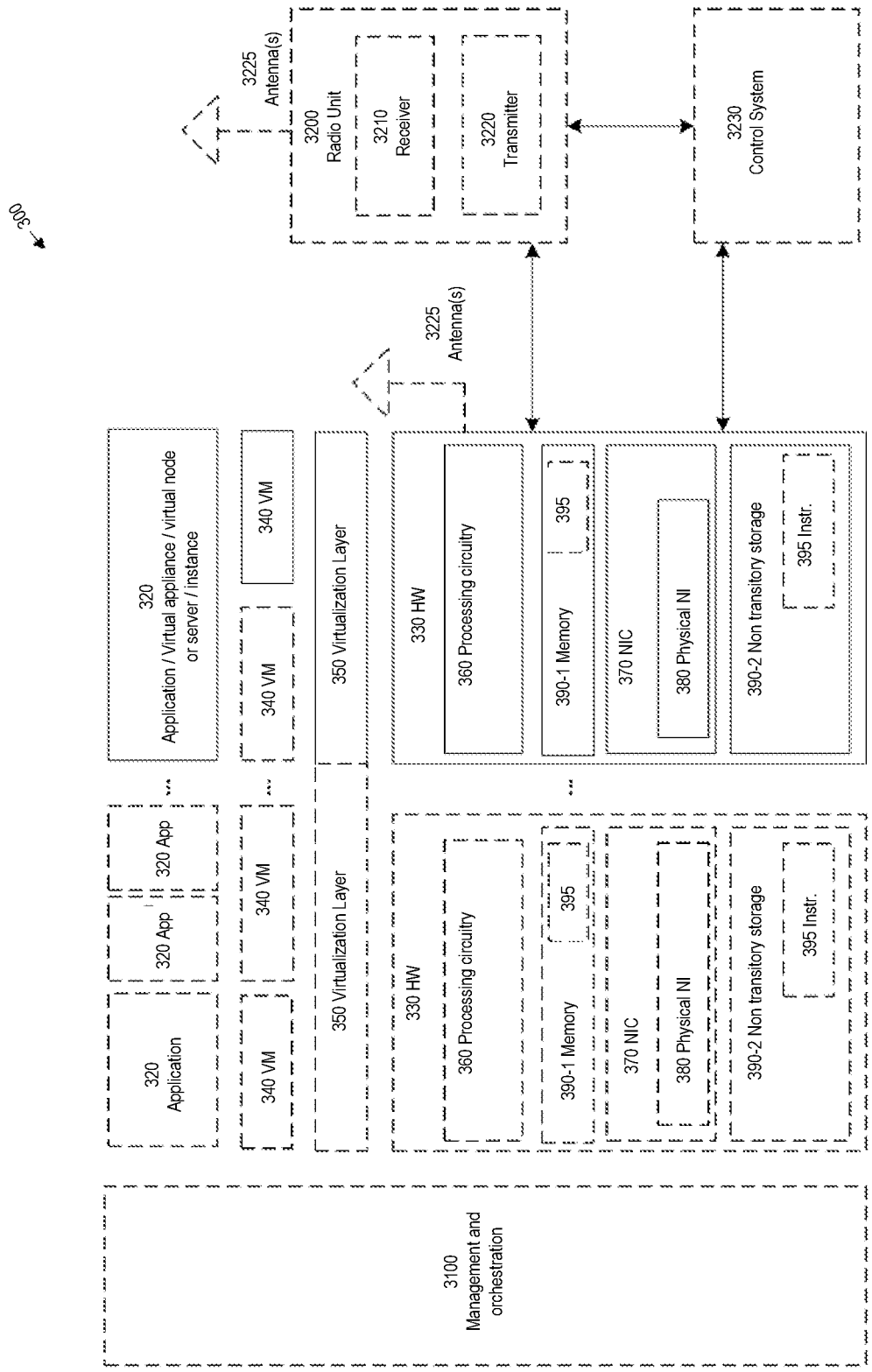
FIG. 6 is a diagram of a virtualization environment in accordance with some embodiments of the present disclosure.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE 200, a wireless device 110 or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 7:
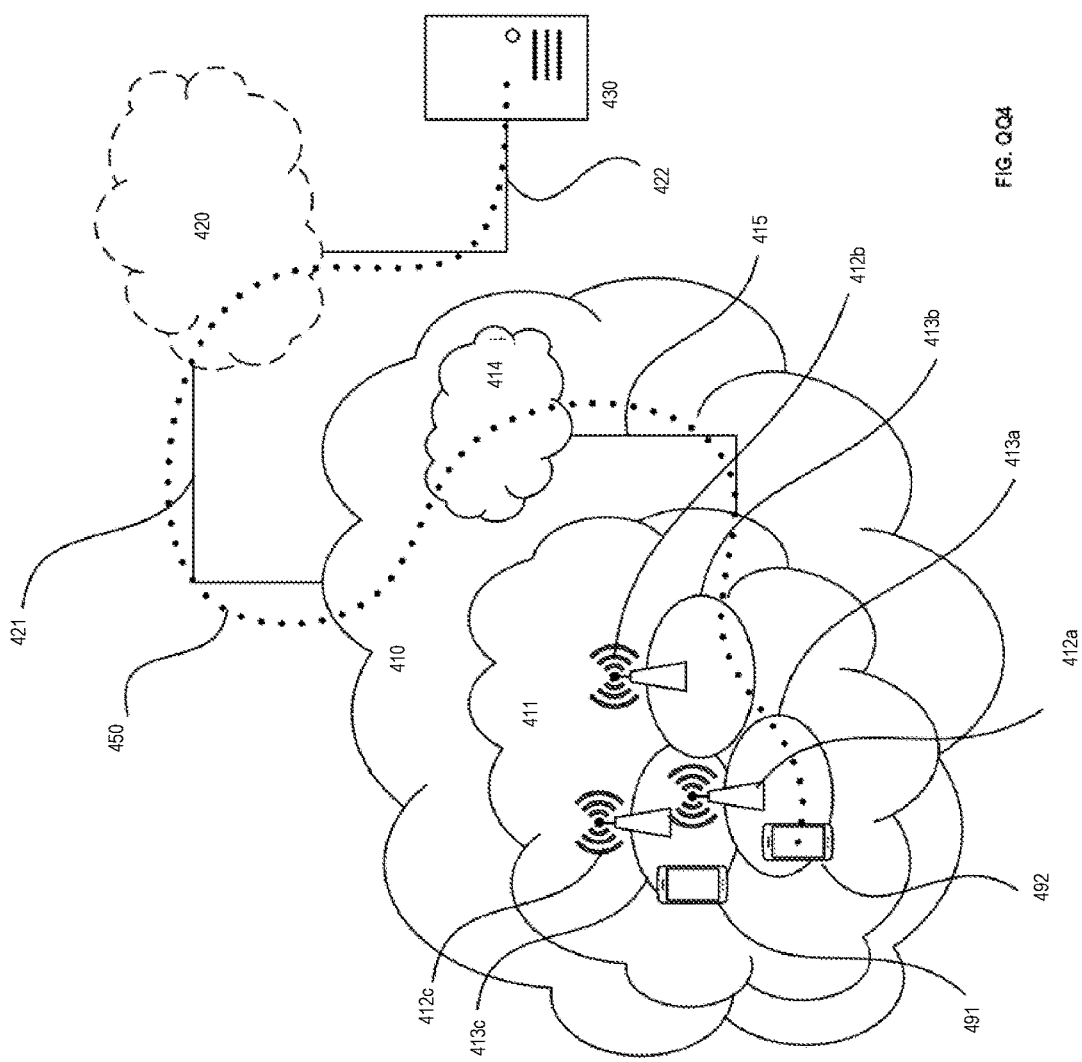
FIG. 7 is a diagram of a telecommunication network connected via an intermediate network to a host computer in accordance with some embodiments of the present disclosure.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

In one or more embodiments, UEs 491, 492 are examples of WD 110, and base station 412 is an example of network node 160.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 8:
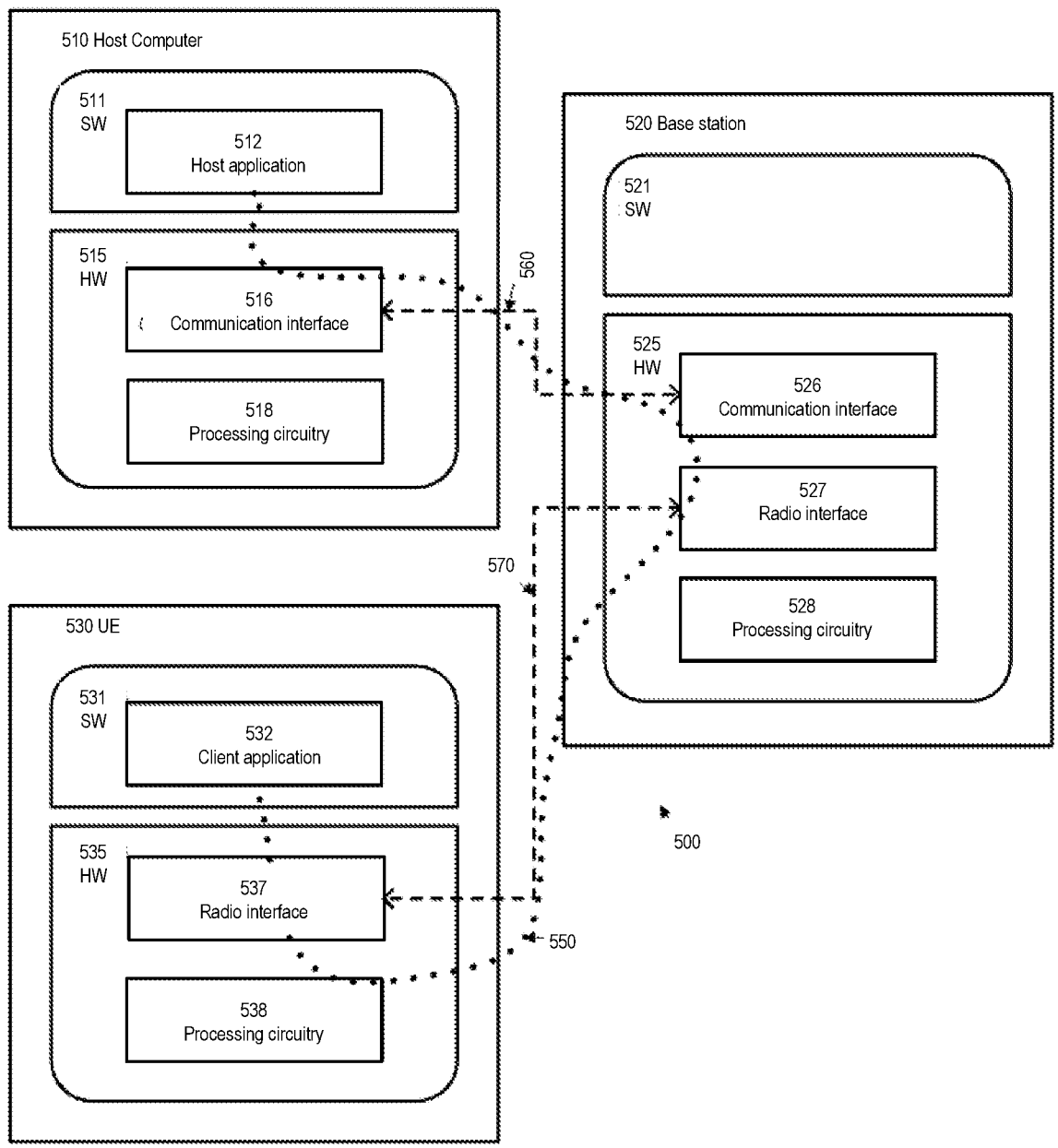
FIG. 8 is a diagram of a host computer communicating via a base station with a user equipment over a partially wireless connection in accordance with some embodiments of the present disclosure.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the effectiveness of average power control applied for a network node, such as an advanced antenna systems (AAS), by applying a hard limit triggering earlier and thereby providing benefits such as preventing overshoot of any computed average power threshold, computed so that RF exposure limitations are guaranteed outside an exclusion zone.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
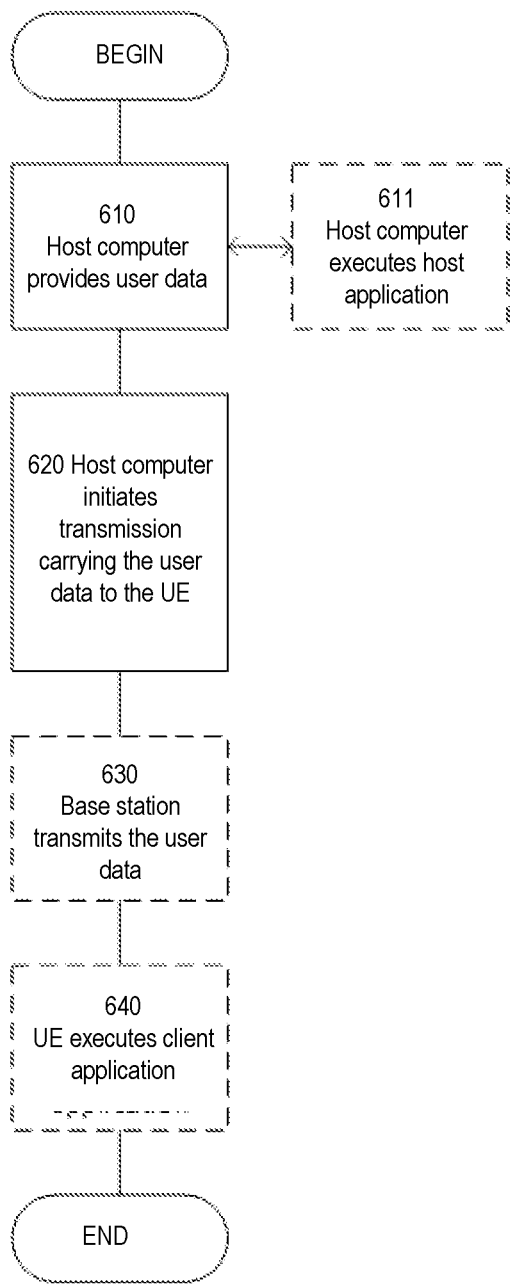
FIG. 9 is a flow diagram of a method implemented in a communication system including a host computer, a base station and user equipment in accordance with some embodiments of the present disclosure.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
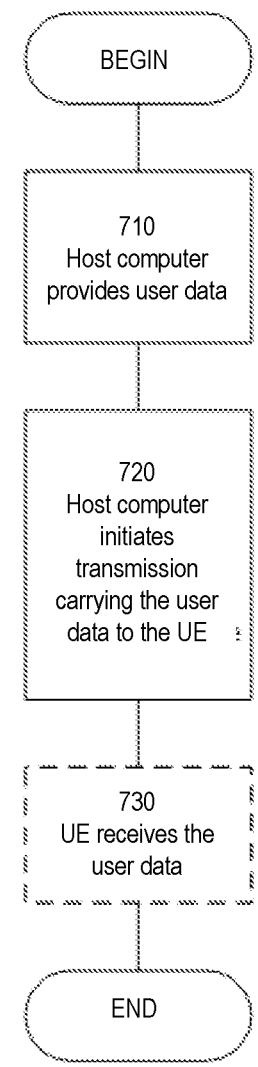
FIG. 10 is a flow diagram of another method implemented in a communication system including a host computer, a base station and a user equipment in accordance with some embodiments of the present disclosure.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
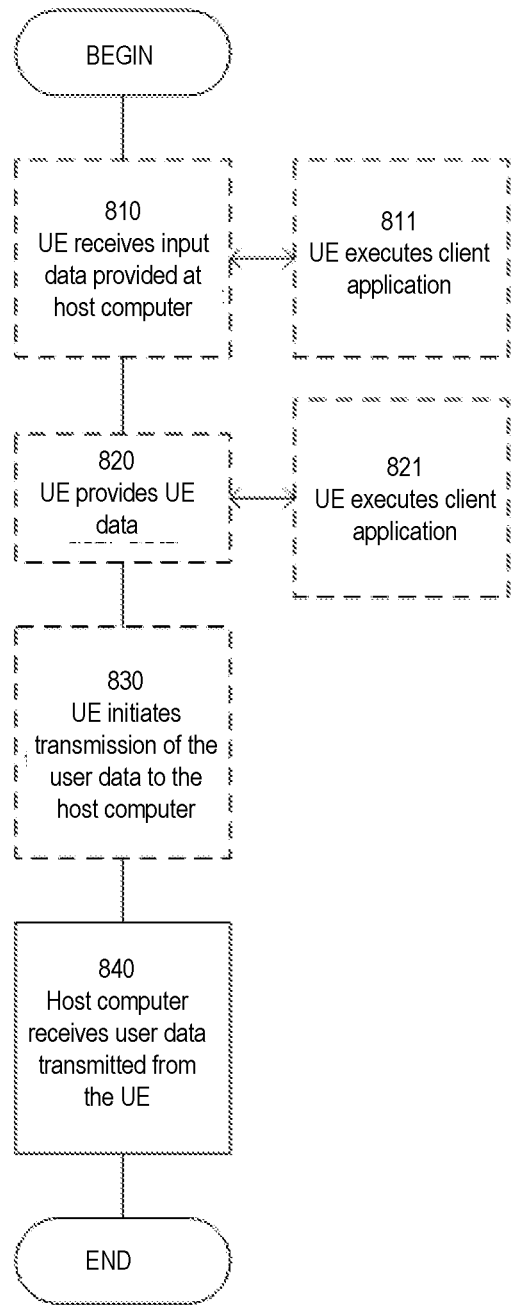
FIG. 11 is a flow diagram of another method implemented in a communication system including a host computer, a base station and a user equipment in accordance with some embodiments of the present disclosure.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
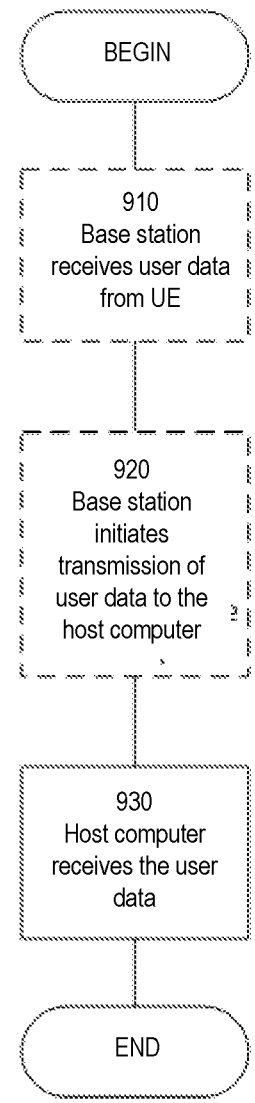
FIG. 12 is a flow diagram of another method implemented in a communication system including a host computer, a base station and a user equipment in accordance with some embodiments of the present disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

In one or more embodiments, the UEs referred to in FIGS. 9-12 may correspond to WD 110 and/or UE 200, while the base stations referred to in FIGS. 9-12 correspond to network node 160.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
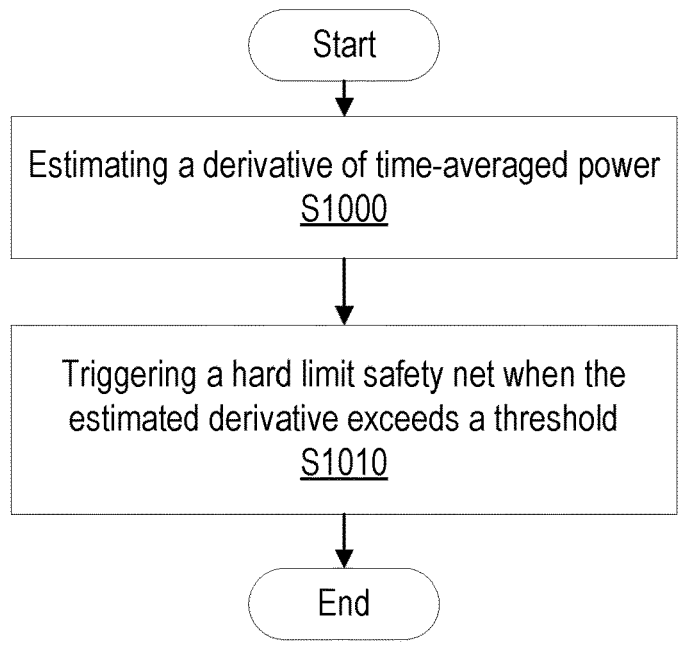
FIG. 13 is a flow diagram of a process using a derivate estimate in accordance with some embodiments of the present disclosure.

FIG. 13 depicts a method in accordance with particular embodiments, the method begins at step 1000 with the estimating such as via processing circuitry 528 and/or processing circuitry 360 of a derivative of time-averaged power. At step 1010, the triggering of a hard limit is commenced such as via processing circuitry 528 and/or processing circuitry 360 when the estimated derivative exceeds a threshold.

Figure 14:
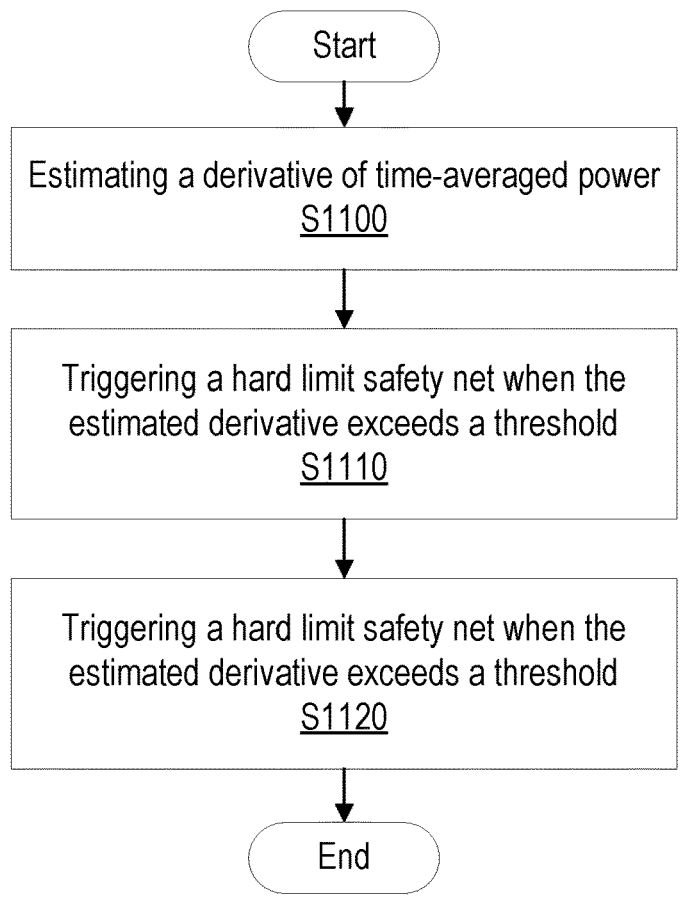
FIG. 14 is a flow diagram of another process using a derivate estimate in accordance with some embodiments of the present disclosure.

FIG. 14 depicts another method in accordance with particular embodiments. One or more Blocks and/or functions performed by network node may be performed by one or more elements of network node 160 such as via processing circuitry 528 and/or processing circuitry 360, estimating unit 02 (described below), triggering unit 04 (described below), etc. In one or more embodiments, network node such as via processing circuitry 528 and/or processing circuitry 360, estimating unit 02, etc., is configured to estimate (Step 1100) a derivative of time-averaged transmit power of the network node, as described herein. In one or more embodiments, network node such as via processing circuitry 528 and/or processing circuitry 360, estimating unit 02, etc., is configured to determine (step 1110) that the estimated derivative meets a first threshold, as described herein. In one or more embodiments, network node such as via processing circuitry 528 and/or processing circuitry 360, triggering unit 04, etc., is configured to trigger (step 1120) at least one action to limit the time-averaged transmit power of the network node based on the determination that the estimated derivative meets the first threshold, as described herein.

According to one or more embodiments, the estimate of the derivative of time-averaged transmit power is performed using a Proportional-Integral, PI, control function where an integrator has been factored out to provide a proportional term and derivative term. According to one or more embodiments, the PI control function with the factored out integrator provides average power back-off control with an integrating resource limiting threshold. According to one or more embodiments, the at least one action includes limiting a quantity that correlates with momentary transmit power output by the network node.

According to one or more embodiments, the quantity is a quantity of resources used for transmission. According to one or more embodiments, the processing circuitry is further configured to determine total momentary output power of the network node by one of measuring the total momentary output power and predicting the total momentary output power. According to one or more embodiments, the predicting of the total momentary output power is based at least on estimating resources used at at least one time instant over time.

According to one or more embodiments, the processing circuitry such as via processing circuitry 528 and/or processing circuitry 360 is further configured to monitor a second threshold using time-averaged transmit power, the estimated derivative being configured to meet the first threshold before the time-averaged transmit power meets the second threshold. According to one or more embodiments, the processing circuitry is further configured to discretize a dynamic resource threshold that corresponds to a portion of total resources used for transmission and a control signal that is based on a proportional-derivative (PD) type function that is used to estimate the derivative of time-averaged transmit power. According to one or more embodiments, the limiting of the time-averaged transmit power corresponds to reducing the time-average transmit power.

Figure 15:
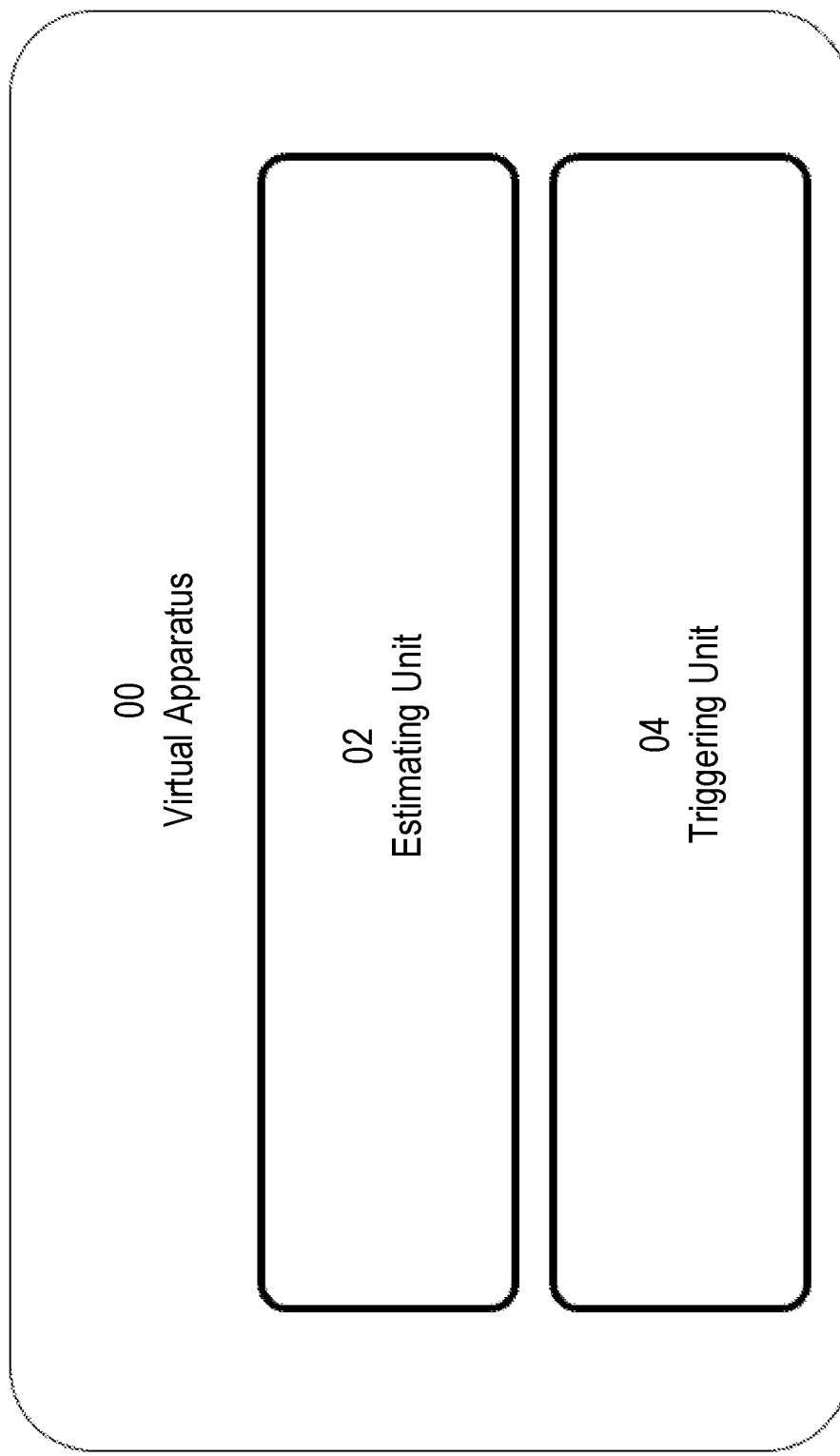
FIG. 15 is a diagram of a virtualization apparatus in accordance with some embodiments of the present disclosure.

FIG. 15 illustrates a schematic block diagram of an apparatus 00 in a wireless network (for example, the wireless network shown in FIG. 4). The apparatus may be implemented in a wireless device or network node (e.g., wireless device 110 or network node 160 shown in FIG. 4). Apparatus 00 is operable to carry out the example method described with reference to FIG. 130 and possibly any other processes or methods disclosed herein. It is also to be understood that the method of FIG. 13 is not necessarily carried out solely by apparatus 00. At least some operations of the method can be performed by one or more other entities.

Virtual Apparatus 00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause estimating unit 02 and triggering unit 04, and any other suitable units of apparatus 00 to perform corresponding functions according one or more embodiments of the present disclosure.

As illustrated in FIG. 15, apparatus 00 includes an estimating unit 02 and a triggering unit 04, and estimating unit 02 is configured to estimate a derivative of time-averaged power. Triggering unit 04 is configured to trigger a hard limit to prevent the overshoot of an average power threshold, computed so that RF exposure limitations are guaranteed outside an exclusion zone.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Having generally described arrangements for controlling average transmit power using a derivative function, details for these arrangements, functions and processes are provided as follows, and which may be implemented by the network node.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments of the present disclosure, a power controller having a dynamic actuator and a proportional-derivative (PD) controller are described below. However, a number of alternative controllers, applicable for more advanced directional control and using different actuator mechanisms, may also be combined with the present invention. In one or more embodiments, the power controller may be provided by processing circuitry 528 and/or processing circuitry 360.

Scheduler Actuator

Factored Out Integration Operation

Figure 16:
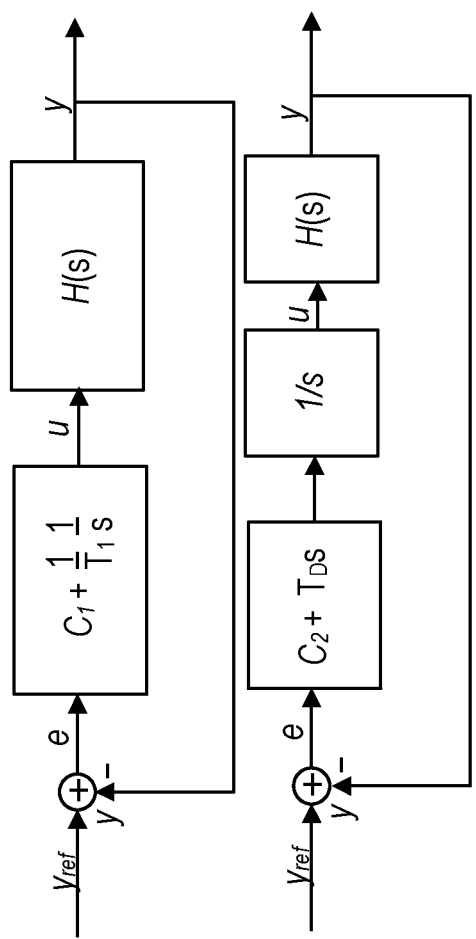
FIG. 16 is a diagram of two realizations of PI control where the lower one is a factored out integrated in accordance with some embodiments of the present disclosure.

In some embodiments, an average power controller, described herein, may use of the lower realization of PI control in FIG. 16 where the realization factors out an integrator. That integrator or integrator function may be placed in or close to the scheduler, to produce the dynamics of the resource limiting threshold. As illustrated in FIG. 16, the remaining dynamics of the PI-controller resembles a proportional term and a differentiating term such that, in one or more embodiments, a PI control function is modified by factoring out the integrator in order to provide PD control type functions while still allowing for the integration of a resource limiting threshold. This results in an applied average power back-off control that includes a PD control together with an integrating resource limiting threshold. The relation between the parameter of the top and bottom realizations are easily obtained by equating the coefficients for equal degrees of s in $$C_1 + \frac{1}{T_I}\frac{1}{s} \equiv (C_2 + T_D s)\frac{1}{s} = T_D + C_2 \frac{1}{s}.$$

Integrating Factional Scheduler Threshold

In order to get a smooth behavior of the dynamic resource threshold applied in the scheduler to limit the output power, it needs to be rate controlled. This means that the control signal commands adjustments to the limiter, making it increase or decrease. The dynamics of the actuator mechanism (dynamic resource threshold) is therefore determined to be $$\dot{\gamma}(t) = u(t),$$

where $\gamma(t)$ is the dynamic resource threshold and where $u(t)$ is the control signal further discussed below. t denotes continuous time. This is in line with the factored PI control structure of FIG. 16, which may be implemented by processing circuitry 528 and/or processing circuitry 360. The dynamic resource threshold is decoupled from the scheduler algorithms themselves and is expressed as a fractional limitation of the scheduler not to use more than a fraction $\gamma(t)$ of its total resources. The scheduler may then limit the number of frequency resources (physical resource blocks, PRBs) it uses, or limit any other quantity that correlates well with the momentary output power.

Integrating Factional Scheduler Threshold Limitation

The maximum value of $\gamma(t)$ is 1.0 since it is to express a fraction of the maximum amount of scheduler resources. There is also a need to limit its lower value, to avoid that the dynamic feedback control mechanism reduces it to an unphysical value below 0.0. The following scheduler threshold limitation is therefore applied at each time, $$\gamma_{low} \leq \gamma(t) \leq 1.$$

Power Feedback Signal

Radio Measurement

The total momentary transmitted power applied to an antenna array can be measured in the radio, just before the antenna. In some embodiments, this can be done by couplers that measure the radio signal amplitude at each signal path to an antenna element. These amplitudes can then be combined into a total output power of the radio, with the antenna gain removed.

Scheduler Prediction

In other embodiments, the measured power is replaced by a predicted output power using information available in the scheduler or elsewhere in base band. Such a quantity could be easily obtained, e.g., by summing up the momentary scheduled power as estimated by the fraction of PRBs used at each time instant, over the time T.

This approach is however subject to a number of errors. These include e.g., the actual power errors caused by re-transmissions, power boosting and power sharing between transmission layers errors, as well as errors caused by radio signal processing close to the antenna, including e.g., clipping to achieve peak to average power reductions, and antenna alignment errors.

Feedback Control Algorithm

PD Control

Figure 17:
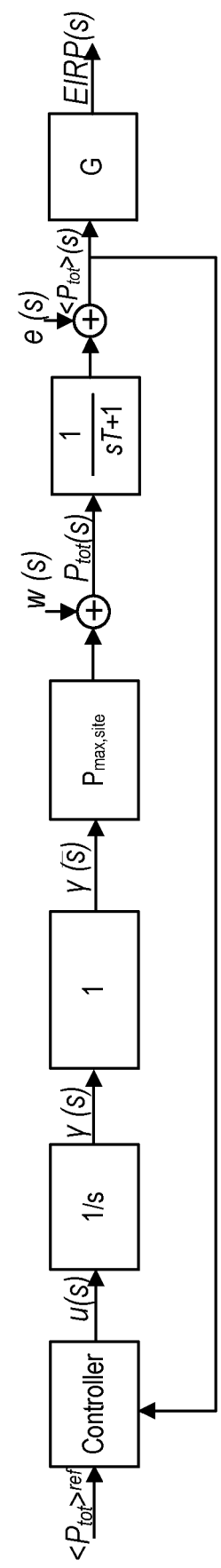
FIG. 17 is a diagram of a feedback control block diagram in accordance with some embodiments of the present disclosure.

Reference is made to FIG. 17 to describe embodiments of a feedback control mechanism. FIG. 17 describes the case where feedback control has been enabled by the supervision mechanism described below.

In FIG. 17, $\langle P_{tot} \rangle^{ref}$ denotes the setpoint for the averaged power (typically slightly less than the power threshold value that has been obtained from the RF exposure limit and the desired exclusion zone), 1/s denotes the actuator dynamics with lower and upper limits inactive, $\bar{\gamma}(t)$ denotes the scheduler limitation after lower and upper limitation (inactive in FIG. 17), $P_{max,site}$ denotes the maximal total power of the site, w(t) denotes a disturbance representing predicted power errors, 1/(sT+1) represents an autoregressive simplified model of the averaging, $\langle P_{tot} \rangle(s)$ denotes the averaged total power, e(s) denotes a measurement error, G denotes the antenna gain and EIRP(s) denotes the EIRP. Note that all quantities are here expressed in the Laplace transform domain, which is allowed since the feedback control mechanism design is performed with constraints inactive. The momentary power described above is denoted $P_{tot}(s)$. It is noted that w(s) and e(s) are not a part of the implemented invention, they are only a mathematical approximation of errors in the control loop, useful to assess performance aspects of the invention.

It is then assumed that the controller block is given by $$u(s) = CT(1+T_D s)(\langle P_{tot} \rangle^{ref} \langle P_{tot} \rangle(s)).$$

This controller is of proportional-derivative (PD) type, which may be referred to as a PD controller that is implemented by processing circuitry 528 and/or processing circuitry 360. C denotes the proportional gain, and TD the differentiation time. Following standard procedures of automatic control, the poles of the closed loop system of FIG. 17 are given by the following second order equation $$s^2 + (1/T + P_{max,site} CT_D)s + P_{max,site} C = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as $$s^2 + (\alpha_1 + \alpha_2)s + \alpha_1 \alpha_2 = 0.$$

An identification of coefficients and solution of the resulting system of equations reveal that the proportional gain and differentiation time shall be selected as $$C = \frac{\alpha_1 \alpha_2}{P_{max,site}},$$

$$T_D = \frac{\alpha_1 + \alpha_2 - \frac{1}{T}}{\alpha_1 \alpha_2}.$$

A reason for this choice is that a system with two negative real poles can be expected to be well damped, which is a result of a significant differentiation action. Since differentiation action is needed for fast response close to the determined threshold, this is the preferred design choice.

Some additional modification of the controller may be made to adapt to the one-sided power back-off control problem formulation. This includes only allowing negative differentiation control, and a hard limit applied in case the average power gets too close to the power threshold. The asymmetric differentiation can be formulated as $$u(t) = CTe(t) + CTT_D \max(0, \dot{e}(t)).$$

To implement the feedback control mechanism, $\langle P_{tot} \rangle$ ref, $\langle P_{tot} \rangle(t)$ and $\langle P_{tot} \rangle(t)$ are needed.

Discretization

In the previous embodiments, the formulation has been done in continuous time. However, in some additional embodiments, the implementation may be performed in discrete time. This means that all dynamic parts of the controller and actuator needs to be discretized. The averaging of the momentary power does not need to be discretized since this is done at sampling rate, either by a recursive computation of the true average, or by applying summation. Thus, the equations of the controller and actuator needs to be discretized. Here this is done with an Euler approximation, however other alternatives like the Tustin approximation could be used as well. The Euler approximation replaces the Laplace transform variable s, with the discrete time approximation of this derivative, i.e.

$$s \to \frac{(q_{(T_S)}) - 1}{T_S}$$

Here $T_S$ denotes the sampling period, and $q_{T_s}^{-1}$ is the one step delay operator. It is stressed that this implicitly assumes regular sampling in time, with very little jitter. Sampling cannot be event based. Therefore, a system clock is needed to drive the discrete time feedback control loop.

Starting with the actuator and using the fact that $$s\gamma(s) = u(s)$$

results in the discrete time equation $$\gamma(t+T_S) = \gamma(t) + T_S u(t).$$

When sampling the PD controller, it is noted that there is no effect on the proportional term, however the error signal needs to be differentiated. Since the reference value is constant it follows that it is the derivative of the average power that needs sampling. It is first noted that because of the differentiation, filtering of this derivative is also needed, according to the equation $$y(s) = \frac{\alpha}{s+\alpha} s(\langle P_{tot} \rangle^{ref} - \langle P_{tot} \rangle(s)) = -\frac{\alpha s}{s+\alpha} \langle P_{tot} \rangle(s)$$

were the filter bandwidth may be selected to α=0.05 rad/s. Here the derivative is denoted by y(s). Following the same procedure as for the actuator results in the discrete time equation $$y(t) = y(t-T_S) - \alpha T_S y(t-T_S) - \alpha(\langle P_{tot} \rangle(t) - \langle P_{tot} \rangle(t-T_S)).$$

The discrete time control signal therefore becomes $$u(t) = CT(\langle P_{tot} \rangle(t)^{ref} \langle P_{tot} \rangle(t) - T_D \max(y(t), 0.0)).$$

New Derivative Based Hard Limit

Overview

As described herein, a PD controller that may be implemented, for example, by processing circuitry 528 and/or processing circuitry 360 is used in some embodiments. The derivative term is available for each control step, i.e., each update step of the algorithm. In prior art solution and disclosures, the hard limit is triggered mainly by checking if the time-averaged power is above a threshold.

Main Idea and New Hard Limit Triggering

In some embodiments, the derivative is calculated using the following differential equation, that employs filtering with time $T_1$.

$$\langle \dot{P}_{tot} \rangle(t) = -\frac{1}{T_1} \langle P_{tot} \rangle(t) + \frac{1}{T_1} P_{tot}(t).$$

Figure 18:
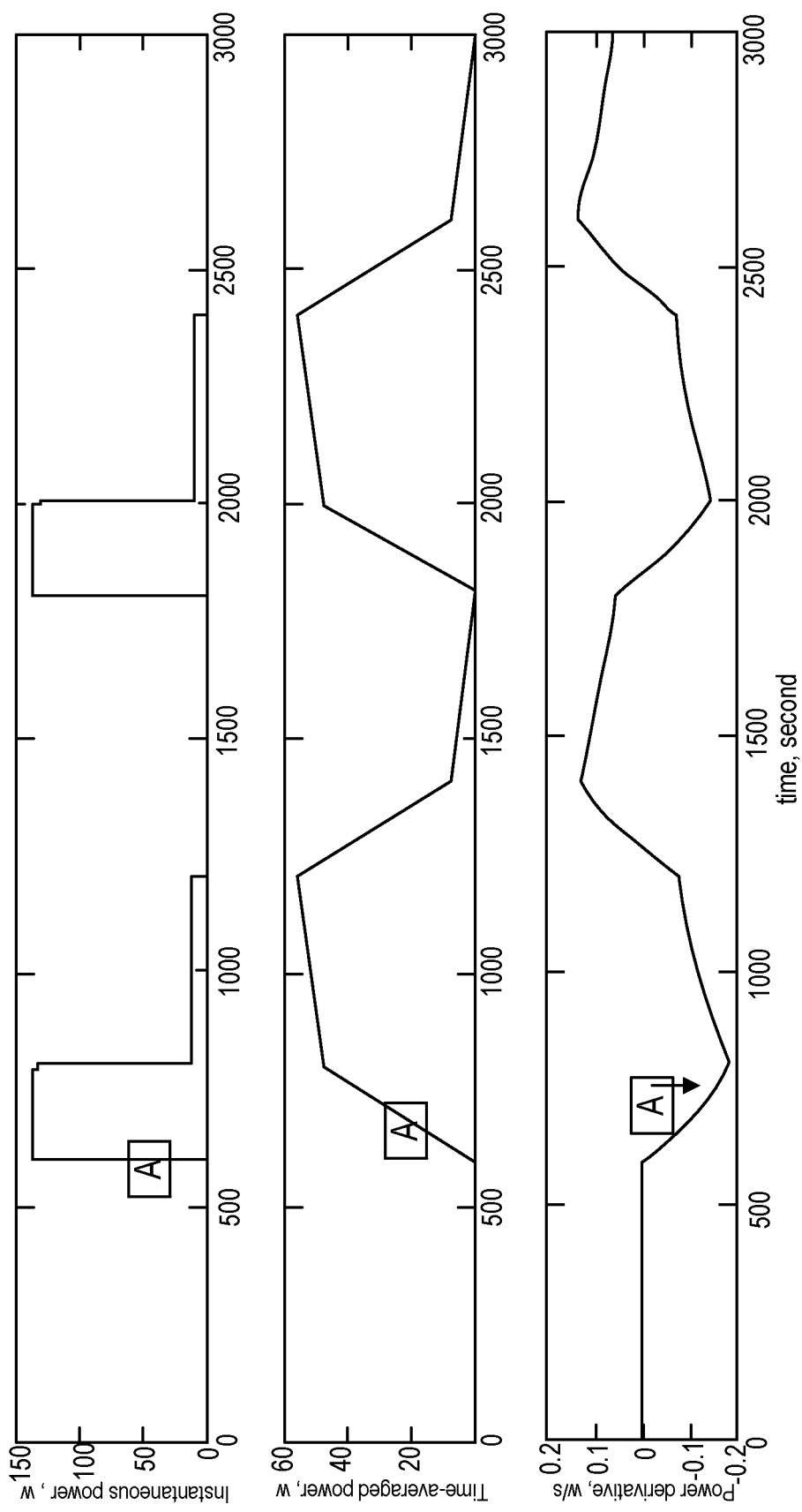
FIG. 18 is a diagram of a derivative based hard limit trigger in accordance with some embodiments of the present disclosure.

The derivative estimate is used to trigger the enhanced hard limit. If the derivative is high enough, it could mean that a sharp traffic jump has occurred recently. This is illustrated in FIG. 18. As illustrated in FIG. 18, during event A when the instantaneous power has a sharp increase, the magnitude of the power derivative increases accordingly. When event A occurs, the hard limit should be triggered immediately even though the averaged power is not high enough. This is expressed by the following algorithm, if  Ptotaverage(n,i)>hard_limit_power_threshold   OR derivative(n,i)>derivative_threshold hardlimit(1,i)=1 end

Performance Evaluation

Figure 19:
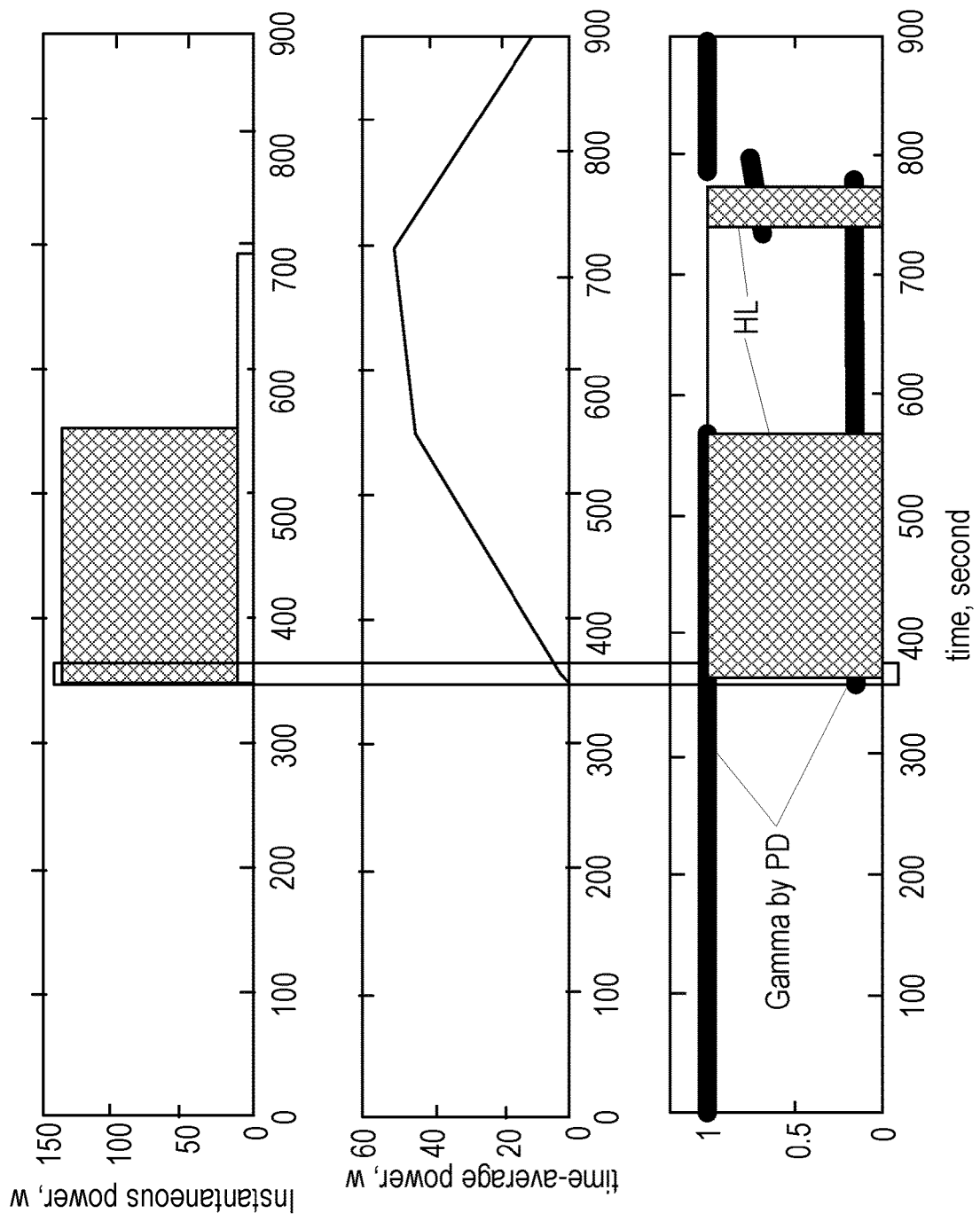
FIG. 19 is an enlarged version of the diagram of FIG. 18 in accordance with some embodiments of the present disclosure.

For example, FIG. 19 is the zoomed in version of FIG. 18. As shown in both FIG. 18 and FIG. 19, the hard limit can be triggered as early as 360 seconds, at which time the time-averaged power is still quite low. The hard limit trigger happens much earlier compared to the existing method, which is around 560 seconds, i.e., when the time-averaged power exceeds certain threshold.

SOME EXAMPLES

Group A Examples

1. A method for hard limit triggering of a power limiter in a network node such as network node 160 or base station 520 equipped with an advanced antenna system (AAS), the method comprising:
   estimating a derivative of time-averaged transmit power of the network node; and
   triggering a hard limit when the estimated derivative exceeds a threshold thereby performing limitation of said average transmit power of the network node.

2. A system for hard limit triggering of power limiter in a network node such as network node 160 equipped with an advanced antenna system (AAS), the system comprising:
   a power controller, which may be implemented by, for example, processing circuitry 528 and/or processing circuitry 360, having an actuator and a controller, the power controller configured to determine an estimated derivative of the time-averaged power of the network node and to trigger a hard limit if the estimated derivative exceeds a threshold thereby performing limitation of said average transmit power of the network node.
3. The system of embodiment 2-3 wherein the actuator is a dynamic actuator.
4. The system of embodiments 2-3 wherein the controller is a proportional derivative controller Group B Examples 1. A method performed by a base station such as network node 160 or base station 520 for to determine when to trigger a hard limit, the method comprising:
   a. estimating a derivative of time-averaged power; and
   b. triggering a hard limit when the estimated derivative exceeds a threshold.
2. A communication system including a host computer 430 comprising:
   processing circuitry 528 configured to provide user data; and
   a communication interface configured to forward the user data to a cellular network for transmission to a user equipment (UE) 530 or wireless device 110,
   wherein the cellular network comprises a base station such as network node 160 or base station 520 having a radio interface and processing circuitry, the base station's processing circuitry configured to perform any of the steps of any of the Group B examples.
3. The communication system of the previous embodiment further including the base station.
4. The communication system of the previous two embodiments, further including the UE, wherein the UE is configured to communicate with the base station.
5. The communication system of the previous three examples, wherein:
   the processing circuitry 528 of the host computer is configured to execute a host application, thereby providing the user data; and
   the UE 530 comprises processing circuitry 538 configured to execute a client application 531 associated with the host application 512.
6. A method implemented in a communication system including a host computer 510/430, a base station such as network node 160 or base station 523 and a user equipment (UE) such as wireless device 200 or UE 530, the method comprising:
   at the host computer 510/430, providing user data; and
   at the host computer 510/430, initiating a transmission carrying the user data to the UE via a cellular network comprising the base station, wherein the base station performs any of the steps of any of the Group B examples.
7. The method of the previous examples, further comprising, at the base station such as network node 160 or base station 520, transmitting the user data.
8. The method of the previous two examples, wherein the user data is provided at the host computer 510/430 by executing a host application 512, the method further comprising, at the UE, executing a client application 532 associated with the host application 512.
9. The communication system of the previous embodiment, wherein the cellular network further includes a base station configured to communicate with the UE.
10. The communication system of the previous two examples, wherein:
    the processing circuitry 518 of the host computer 510/430 is configured to execute a host application 512, thereby providing the user data; and
    the UE's processing circuitry 538 is configured to execute a client application 532 associated with the host application 512.
11. The method of the previous embodiment, further comprising at the UE, receiving the user data from the base station.
12. The communication system of the previous example, further including the UE.
13. The communication system of the previous examples, further including the base station, wherein the base station comprises a radio interface such as radio interface 527 configured to communicate with the UE and a communication interface such as communication interface 526 configured to forward to the host computer the user data carried by a transmission from the UE to the base station.
14. The communication system of the previous examples, wherein:
    the processing circuitry such as processing circuitry 518 of the host computer is configured to execute a host application 512; and
    the UE's processing circuitry such as processing circuitry 538 is configured to execute a client application 532 associated with the host application 512, thereby providing the user data.
15. The communication system of the previous examples, wherein:
    the processing circuitry 528 of the host computer is configured to execute a host application 510, thereby providing request data; and
    the UE's processing circuitry 538 is configured to execute a client application 532 associated with the host application 512, thereby providing the user data in response to the request data.
16. The method of the previous example, further comprising, at the UE 530, providing the user data to the base station.

Abbreviations

At least some of the following abbreviations may be used in this disclosure. If there is an inconsistency between abbreviations, preference should be given to how it is used above. If listed multiple times below, the first listing should be preferred over any subsequent listing(s).
AAS Active Antenna System
RF Radio Frequency
EMF Electromagnetic Field
PD Proportional Derivative
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for controlling transmit power, the network node comprising:
    processing circuitry configured to:
        estimate a derivative of time-averaged transmit power of the network node;
        determine that the estimated derivative meets a first threshold;
        determine total momentary output power of the network node by predicting the total momentary power based at least on estimating resources used based on a fraction of physical resource blocks, PRBs, used at each time instant over a time period; and
        trigger at least one action to limit the time-averaged transmit power of the network node based on the determination that the estimated derivative meets the first threshold, the at least one action comprising limiting a quantity of PRBs usable for transmission, the quantity of PRBs correlating with momentary transmit power output by the network node.

2. The network node of claim 1, wherein the estimate of the derivative of time-averaged transmit power is performed using a Proportional-Integral, PI, control function where an integrator has been factored out to provide a proportional term and derivative term.

3. The network node of claim 2, wherein the PI control function with the factored out integrator provides average power back-off control with an integrating resource limiting threshold.

4. The network node of claim 2, wherein the PI controller function comprises a proportional term and a differentiating term.

5. The network node of claim 1, wherein the processing circuitry is further configured to monitor the time-averaged transmit power with respect to a second threshold, the estimated derivative being configured to meet the first threshold before the time-averaged transmit power meets the second threshold.

6. The network node of claim 1, wherein the processing circuitry is further configured to discretize:
    a dynamic resource threshold that corresponds to a portion of total resources used for transmission; and
    a control signal that is based on a proportional-derivative, PD, type function that is used to estimate the derivative of time-averaged transmit power.

7. The network node of claim 1, wherein the limiting of the time-averaged transmit power corresponds to reducing the time-average transmit power.

8. A method implemented by a network node for controlling transmit power, the method comprising:
   estimating a derivative of time-averaged transmit power of the network node;
   determining that the estimated derivative meets a first threshold;
   determining total momentary output power of the network node by predicting the total momentary power based at least on estimating resources used based on a fraction of physical resource blocks, PRBs, used at each time instant over a time period; and
   triggering at least one action to limit the time-averaged transmit power of the network node based on the determination that the estimated derivative meets the first threshold, the at least one action comprising limiting a quantity of PRBs usable for transmission, the quantity of PRBs correlating with momentary transmit power output by the network node.

9. The method of claim 8, wherein the estimate of the derivative of time-averaged transmit power is performed using a Proportional-Integral, PI, control function where an integrator has been factored out to provide a proportional term and derivative term.

10. The method of claim 9, wherein the PI control function with the factored out integrator provides average power back-off control with an integrating resource limiting threshold.

11. The method of claim 9, wherein the PI controller function comprises a proportional term and a differentiating term.

12. The method of claim 8, further comprising monitoring the time-averaged transmit power with respect to a second threshold, the estimated derivative being configured to meet the first threshold before the time-averaged transmit power meets the second threshold.

13. The method of claim 8, further comprising discretizing:
   a dynamic resource threshold that corresponds to a portion of total resources used for transmission; and
   a control signal that is based on a proportional-derivative, PD, type function that is used to estimate the derivative of time-averaged transmit power.

14. The method of claim 8, wherein the limiting of the time-averaged transmit power corresponds to reducing the time-average transmit power.

* * * * *